(No Model.)

F. FIRMENICH.
SUGAR PAN.

No. 266,279.  Patented Oct. 24, 1882.

Witnesses:
A. Stark
Willie O. Stark

Inventor:
Frank Firmenich
by Michael J. Stark,
Attorney.

UNITED STATES PATENT OFFICE.

FRANK FIRMENICH, OF BUFFALO, NEW YORK.

SUGAR-PAN.

SPECIFICATION forming part of Letters Patent No. 266,279, dated October 24, 1882.

Application filed August 8, 1882. (No model.)

*To all whom it may concern:*

Be it known that I, FRANK FIRMENICH, of Buffalo, in the county of Erie and State of New York, have invented certain new and useful Improvements on a Sugar-Pan; and I do hereby declare that the following description of my said invention, taken in connection with the accompanying sheet of drawings, forms a full, clear, and exact specification, which will enable others skilled in the art to which it appertains to make and use the same.

My present invention has general reference to sugar-pans; and it consists essentially in the novel and peculiar combination of parts and details of construction and methods of operation, as hereinafter first fully set forth and described, and then pointed out in the claims.

Figure 1:
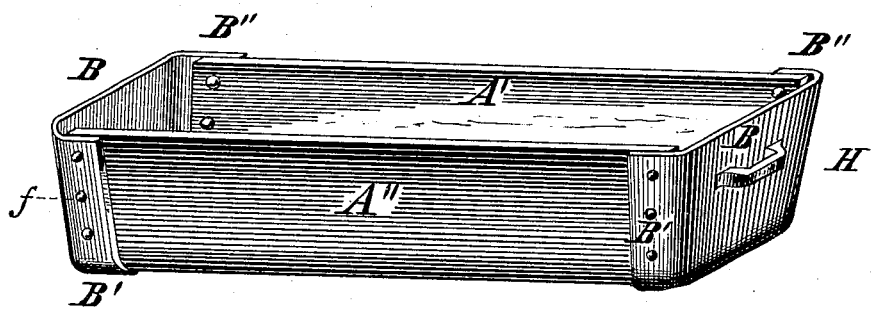
Figure 2:
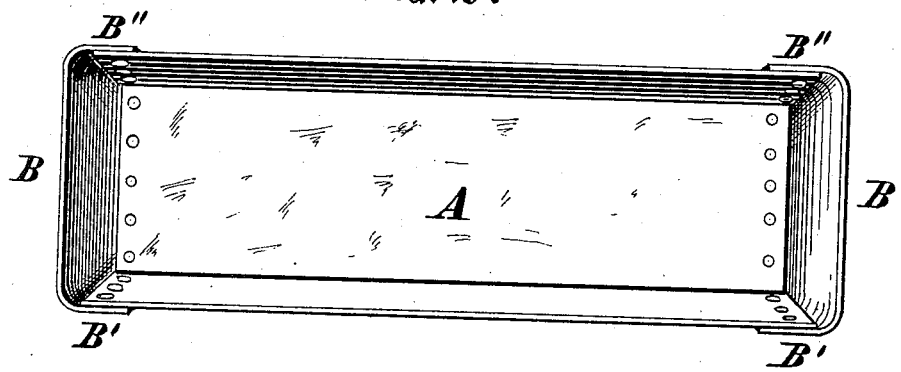
Figure 3:
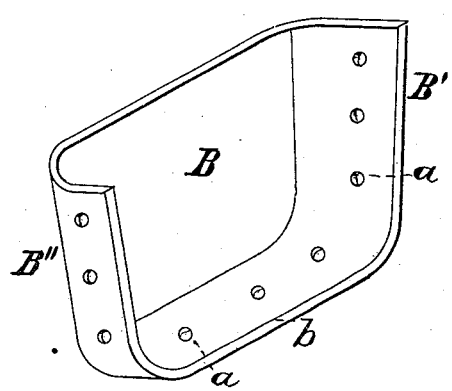
Figure 4:
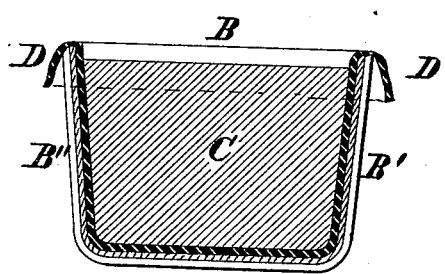

In the drawings already mentioned, which serve to illustrate my said invention more fully, Figure 1 is a perspective view of my improved sugar-pan. Fig. 2 is a plan of the same. Fig. 3 is a perspective view of one of the heads or ends. Fig. 4 is a transverse sectional elevation of the pan and its contents.

Like parts are designated by corresponding letters of reference in all the figures.

Heretofore sugar-pans have almost exclusively been made of galvanized sheet-iron, the same being made tapering, so as to discharge the sugar after cooling and hardening. The heads or ends of these pans, however, are always worn out much sooner than the sides or bottom of said pans, owing, no doubt, to the fact that in inverting the pan and stooping it down upon the floor in order to remove the sugar-cakes the heads suffer very severely. To avoid these drawbacks, and at the same time to enable me to wear out quite a large number of pans of which the sides and bottom are in a good state of preservation, while the heads thereof are entirely worn out, I propose to supply these bodies with heads B, having a lateral flange, B' B'' b, as clearly shown in Fig. 3, extending around said head B, except on its upper edge, said flange being provided with apertures a for the reception of rivets f, by means of which the body of said pans, consisting of the bottom A and sides A' A'', is riveted to the inside of said lateral flange B' B'' b.

It will now be readily observed that on account of the introduction of the comparatively-heavy malleable-iron heads in the construction of the pans, and by placing the lateral flange on the outside of the body thereof, I produce results not obtainable by any other construction, as far as I am aware, the most prominent of which is that I can utilize a large number of otherwise useless pans by removing therefrom the old galvanized iron heads and substituting my malleable-iron head in place thereof, and that, owing to the fact that the flange of the heads is on the outside of the body, the former will take all the wear due to the handling of said pans, thereby enabling me to use much lighter iron for the body and yet produce more durable pans. If it is borne in mind that in some sugar-factories many hundred of these pans are in constant use, and that there is quite a large sum of money invested in these pans, it will be readily seen that my improvements in these necessary adjuncts to a sugar-factory produce quite beneficial results and save the manufacturer many hundreds of dollars per year in the expenditure for pans.

As heretofore mentioned, the pans are made of galvanized sheet-iron, this material being used to prevent the pan from rusting and discoloring the sugar. These pans have to be cleaned very thoroughly every time after they have been used, and this item represents quite an outlay in labor in the manufacture of sugar. As a step toward reform and an improvement upon the use of such pans, I propose to place into the same, before filling with sugar, a lining of textile fabric, D, and then to run the sugar into this bag or lining, allowing said sugar to cool precisely in the same manner as heretofore in vogue and practice. On account of the introduction and use of these bags I derive further beneficial results, which may be stated briefly as follows: The sugar, being run into the lining or bag D, comes only indirectly in contact with the walls of said pan, from which it follows that the pan can in this case be made from black sheet-iron, which is considerably cheaper than galvanized iron. This bag or lining, preventing immediate contact with the walls of the pan, also prevents the sugar from sticking thereto when cooled, so that the removal of the sugar from the pans becomes a comparatively easy matter, and at the same time prevents the rapid wear of said pans. Another advantage derived from the use of the bag or lining is that the pans need not be so scrupulously clean, while the cleaning of the bags becomes a simple matter, which can be readily performed by automatically (or otherwise) operating machinery.

Having thus fully described my invention, I claim as new and desire to secure to me by Letters Patent of the United States—

1. The method of panning and cooling sugar which consists essentially in first placing into the sugar-pans a lining of textile fabric, then running the sugar into the pan, then allowing the sugar to cool and harden, then removing the sugar from the pan, and finally removing the textile fabric from the block of sugar, substantially as and for the object specified.

2. In sugar-cooling pans, the removable textile lining, substantially as specified, for the object stated.

3. In sugar-cooling pans, the combination, with the sides and bottom, of two malleable-iron heads or ends having a lateral flange, B' B" b, projecting outside of said pan over the said sides and bottom, whereby the part b of said flange serves as a rest for said pan, substantially as and for the purpose indicated.

4. In sugar-cooling pans, the combination, with the sheet-metal bottom and sides, of malleable-iron heads or ends, the parts being secured together and adapted for use substantially in the manner and for the purpose specified.

5. A sugar-cooling pan having projecting heads forming projecting parts around said pan and serving as a rest for the same, substantially as described and mentioned.

In testimony that I claim the foregoing as my invention I have hereto set my hand in the presence of two subscribing witnesses.

FRANK FIRMENICH.

Attest:
MICHAEL J. STARK,
JOHN C. DUERR.